United States Patent [19]

Schmidt et al.

[11] Patent Number: 4,991,814
[45] Date of Patent: Feb. 12, 1991

[54] REVERSIBLE VEHICULAR MIRROR ASSEMBLY

[76] Inventors: William P. Schmidt, 21000 Woodruff, Rockwood, Mich. 48173; Frank D. Hutchinson, 28000 Beel Rd., New Boston, Mich. 48164

[21] Appl. No.: 407,639

[22] Filed: Sep. 15, 1989

[51] Int. Cl.⁵ .............................................. A47G 1/24
[52] U.S. Cl. .................................. 248/479; 285/382.7; 350/632; 350/633; 403/104; 403/342
[58] Field of Search .................... 248/479, 475.1, 476, 248/480, 466, 478, 485, 486, 487; 350/631, 633, 638, 632, 604; 285/382.7, 298; 403/104, 342

[56] References Cited

U.S. PATENT DOCUMENTS

| | | | |
|---|---|---|---|
| 4,030,692 | 6/1977 | Szilagyi | 248/487 |
| 4,394,066 | 7/1983 | Sharp | 248/475.1 X |
| 4,500,063 | 2/1985 | Schmidt et al. | 248/475.1 |
| 4,715,701 | 12/1987 | Urban | 248/475.1 X |
| 4,730,913 | 3/1988 | Boothe | 248/480 X |
| 4,793,582 | 12/1988 | Bronstein et al. | 248/479 X |
| 4,854,539 | 8/1989 | Glue | 248/479 |

FOREIGN PATENT DOCUMENTS 0650556 2/1951 United Kingdom ............. 248/475.1

Primary Examiner—Ramon O. Ramirez
Attorney, Agent, or Firm—Arnold S. Weintraub

[57] ABSTRACT

The invention involves a new mirror assembly for large vehicles that enables a mirror to be mounted upward from the vehicle in a first orientation providing a field of view adjacent to the vehicle, and readily adjusted into a second orientation wherein the mirror is outward from the vehicle providing a field of view for behind the vehicle. The assembly includes a rear-view mirror assembly comprising a mirror, a mirror housing, a bracket for mounting the assembly to a vehicle, and a linkage connecting the bracket to the housing. The linkage can be easily rotated relative to the bracket. The mirror housing can be readily disengaged from and reengaged to the linkage thereby enabling a reorientation of the assembly relative to the vehicle. By so doing, an oblong mirror can be mounted to the vehicle in one orientation for driving, disengaged and reengaged in a second orientation for rearward movement of the vehicle.

The linkage between the bracket and the housing is so designed to engage the bracket in multiple mounting orientations, where the first preferred orientation is different from the second preferred orientation. The linkage comprises an arm secured to the housing, and a cantilever between the arm and the bracket. The cantilever is rotatable relative to the bracket, and the arm is revolvable relative to the cantilever.

13 Claims, 3 Drawing Sheets

REVERSIBLE VEHICULAR MIRROR ASSEMBLY

BACKGROUND OF THE INVENTION

1. Field of the Invention

The invention involves a new rear view mirror assembly for mounting on trucks, buses, trailers, boats, small aircraft, and other large vehicles where the driver's rearward visibility is restricted.

2. Background Art

Backing up large vehicles, particularly trucks, continues to be a problem for drivers. Oftentimes, the assistance of one or more persons is required to assist the driver in properly positioning his truck next to a loading dock. The driven (or storage) portion of the truck is generally attached to the driving (or passenger) portion by a swingable linkage assembly. Since the driven portion is generally much larger and heavier than the driving portion, the driver's visibility behind the truck is extremely limited. When backing up, the driver must have a field of view which shows what is behind the vehicle. Hence, the rearward positioning of a large vehicle can be a major undertaking for even the most experienced driver.

While driving in traffic, the driver is most concerned with visibility alongside his vehicle. He needs to clearly observe vehicles in adjacent lanes which will interfere with his vehicle changing lanes. This is a different field of view than that encountered in backing up the vehicle. Mirrors currently being used cannot effectively accommodate both situations because of the incongruity in the field of view sought to be attained. Therefore, neither desired field of view is achieved.

Thus, there exists a need for a rear-view mirror assembly that provides clear visibility alongside the vehicle, and which can be readily adapted for viewing behind the vehicle.

Summary of the Invention

The present invention provides a mirror assembly that enables a mirror to be mounted upward from the vehicle in a first orientation providing a field of view for driving in traffic, and readily adjusted into a second orientation wherein the mirror is outward from the vehicle providing a field of view for rearward movement.

The present invention includes a rear-view mirror assembly comprising a mirror, a mirror housing, a bracket for mounting the assembly to a vehicle, and a linkage connecting the bracket to the housing. The linkage can be easily rotated relative to the bracket. The mirror housing can be readily disengaged from and reengaged to the linkage thereby enabling a reorientation of the assembly relative to the vehicle. By so doing, an oblong mirror can be mounted to the vehicle in one orientation for driving, disengaged and reengaged in a second orientation for rearward movement of the vehicle.

The linkage between the mounting bracket and the housing is so designed that the housing can be engaged to the bracket in multiple mounting orientations, where the first preferred orientation is different from the second preferred orientation. The linkage comprises an arm secured to the housing, and a cantilever between the arm and the bracket. The cantilever is rotatable relative to the bracket, and the arm is revolvable relative to the cantilever. Preferably, the position of the mirror in the first orientation is opposite to the position of the mirror in the second orientation. The housing may have an elongated recessed portion, and the arm may have a branch extending therefrom which mates securely into the recessed portion in both the first and the second orientations.

Also, several different shaped housings and mirrors may be interchanged. A first housing having a first mirror is disengaged from the linkage. A second housing having a second mirror is then engaged to the linkage. The linkage is then rotated relative to the vehicle into a second orientaion which is different from the first orientation.

For a more complete understanding of the reversible mirror assembly of the present invention, reference is made to the following detailed description and accompanying drawings in which the presently preferred embodiments of the invention are illustrated by way of example. It is expressly understood, however, that the drawings are for purposes of illustration and description only, and are not intended as a definition of the limits of the invention. Throughout the following description and drawings, identical reference numbers refer to the same component throughout the several views.

DETAILED DESCRIPTION OF THE INVENTION

Figure 1:
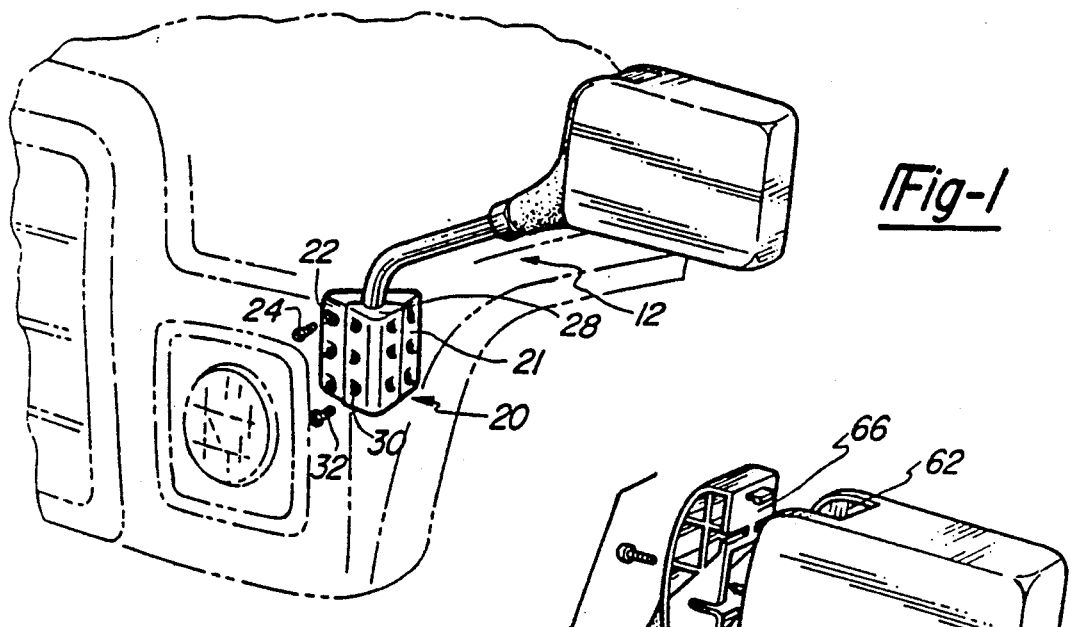
FIG. 1 is a perspective view of a preferred embodiment of the present invention mounted on the driver's side of the hood of a truck.
Figure 6:
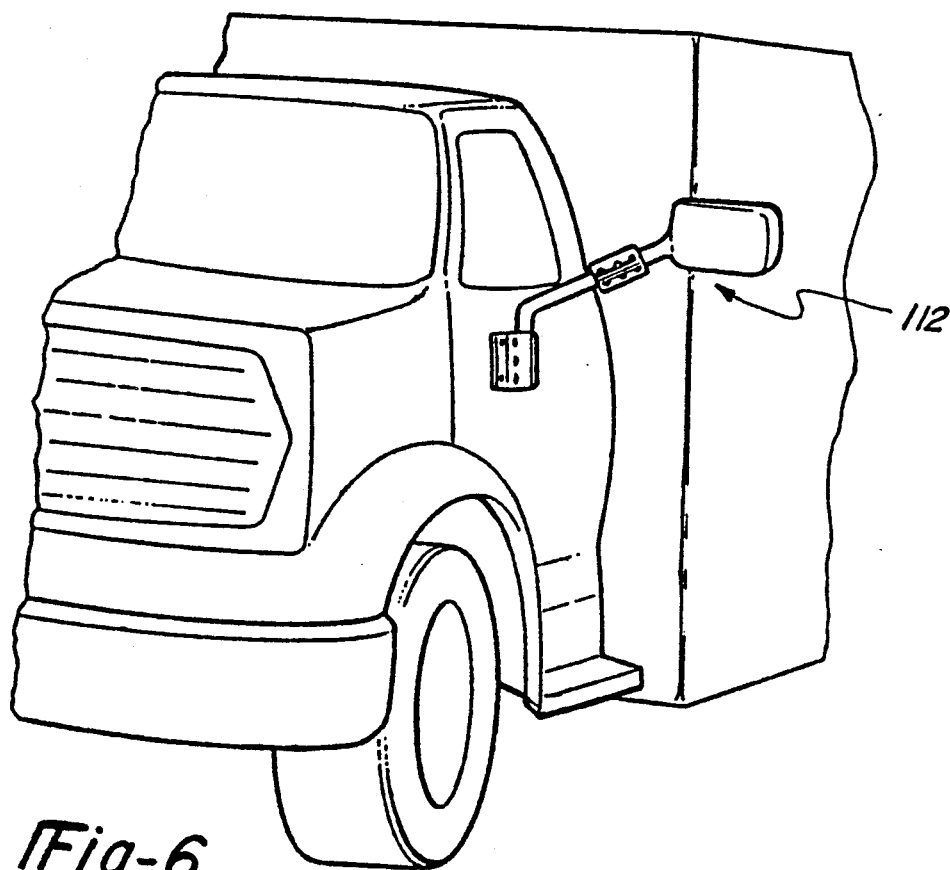
FIG. 6 is a perspective view of another embodiment of the present invention mounted on the truck door on the driver's side.

Referring now to the drawings, FIG. 1, depicts a mirror assembly 12 of the present invention mounted on the front hood of a truck on the driver's side above the headlight. Assembly 12 may also be mounted on the driver's side on a door panel as shown in FIG. 6, by means of a pillar, a post, or the like. Assembly 12 includes a mounting bracket 20. Bracket 20 comprises a keeper 21 and a clamp 28. Keeper 21 is secured to the vehicle by a plurality of holes 22 through which fasteners 24 are inserted. Similarly, mounting clamp 28 has a series of holes 30 through which fasteners 32 secure clamp 28 to keeper 21. A cantilever 40, which is preferably a metal pipe having a bend 42 therein, is mounted to the vehicle between clamp 28 and keeper 21. Bracket 20 is described in more detail in U.S. Pat. No. 4,500,063, the disclosure of which is hereby incorporated by reference.

Figure 2:
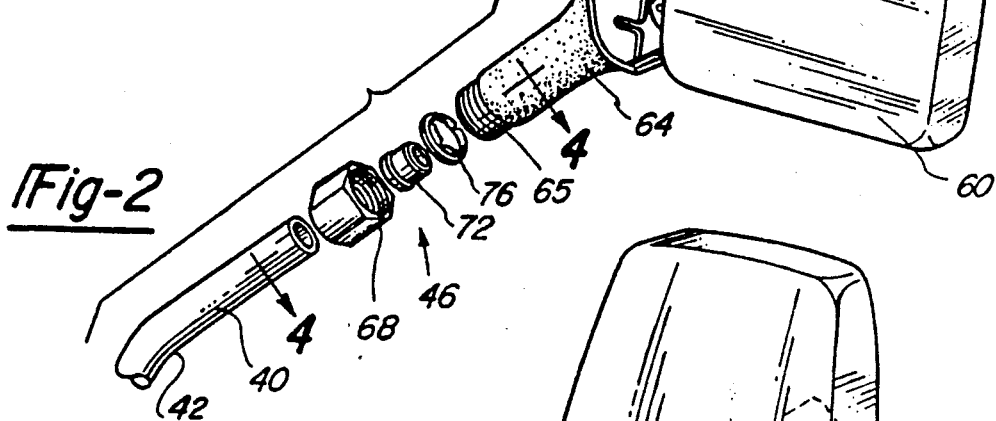
FIG. 2 is an exploded assembly view of the embodiment shown in FIG. 1.
Figure 4:
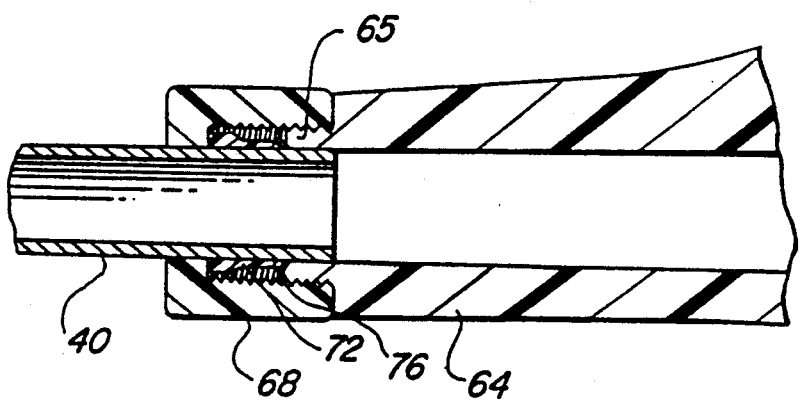
FIG. 4 is a cross-section taken along line 4—4 of FIG. 2.

As shown in FIG. 2, linkage 46 is designed so that housing 60 can be engaged to bracket 20 in multiple mounting orientations. FIG. 4 is an exploded cross-sectional view of linkage 46 taken along lines 4—4 of FIG. 2, showing linkage 46 in the assembled position. Linkage 46 preferably includes an arm 64, a threaded adapter 68, a coupler 72, and a metal sleeve 76. Adapter 68 is internally threaded and mates with threaded end 65 of arm 64. Coupler 72 fits inside adapter 60 to minimize friction during this positioning. Sleeve 76 fits over coupler 72 and serves as a mating surface between threaded end 65 and coupler 72. Linkage 46 is a non-slip linkage which prevents unwanted lowering of mirror housing 60 from cantilever 40.

Figure 5:
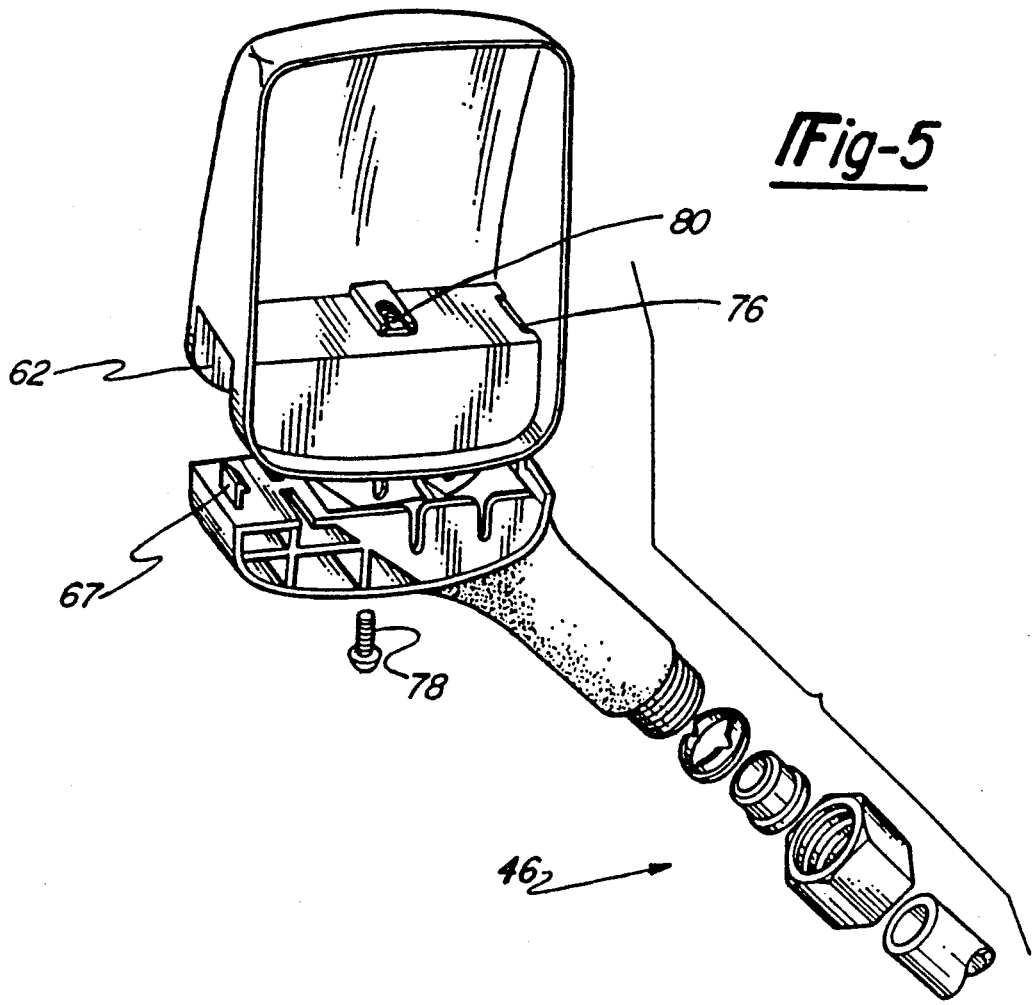
FIG. 5 is another exploded view of the embodiment of FIG. 1 embodiment, showing the mirror housing in a second position.

As shown in FIG. 5, the mirror housing 60 has an elongated recessed portion 62. The end of arm 64 has a skeletal-shaped branch 66 extending therefrom, which mates securely into recessed portion 62 in both the first and the second orientations. To secure housing 60 to arm 64 a threaded fastener 78 is inserted through a hole in arm 64 (not shown) and secured to a threaded hole 80 in housing 60. Branch 66 preferably has two latches 67, one located on each side, which engage into slots 76 of housing 60. Housing 60, and arm 64 are preferably made from molded plastic, and are each unitary members.

Cantilever 40 is rotatable relative to the bracket 20, and arm 64 is pivotable relative to cantilever 40. The height of housing 60 relative to the vehicle can be adjusted by loosing fasteners 32 of clamp 28 and by sliding cantilever 40 either inward or outward. Similarly, as shown in FIG. 3, housing 60 may be moved from a first position into a second position, which may be closer or farther from the vehicle by loosening adapter 68, and by sliding housing 60 up or down cantilever 40.

Mirror assembly 12 is repositioned from a first orientation by disengaging housing 60 from arm 40, and reengaging housing 60 to arm 40 in a second orientation which is, preferably, opposite to the position of the mirror in the first orientation. Adapter 68 is loosened and housing 60 is rotated about 180° relative to the vehicle, and adapter 68 is then tightened. Adapter 68, and coupler 72 are preferably made from molded plastic.

Figure 3:
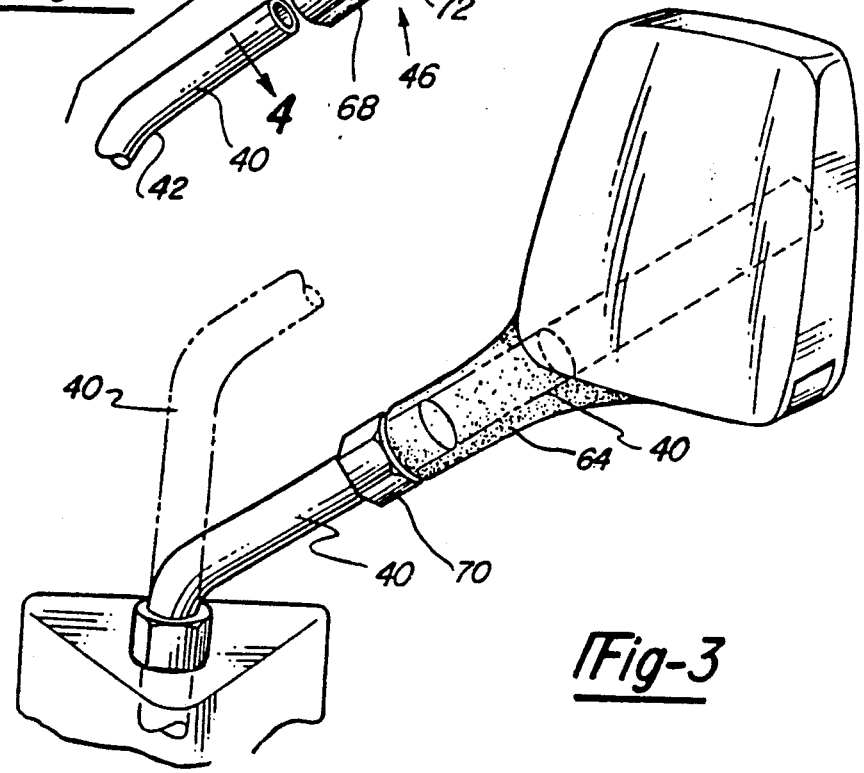
FIG. 3 depicts another embodiment of the present invention.

FIG. 3 depicts another embodiment of the present invention. In this embodiment linkage 46 is mounted to a bracket by connector 70, such that linkage 46 can be rotated relative to the vehicle by simply loosening and subsequently tightening connector 70.

In the orientation shown in FIG. 1, housing 60 extends outward from the vehicle and provides the driver with a field of view to observe objects located behind the vehicle. In the orientation shown in FIG. 3, housing 60 extends upward from the vehicle and provides the driver with a field of view to observe objects located along the driver's side of his vehicle. Preferably, the vehicle has one mirror assembly located on the left side of the vehicle and a second mirror assembly located on the right side of the vehicle.

Several different shaped mirror housings and mirrors may be interchanged rather than repositioning the same mirror. A first housing having a first mirror is disengaged from linkage 46. A second housing having a second mirror is reengaged to linkage 46. Linkage 46 is then rotated relative to the vehicle into a second orientation (see for example FIG. 3) which is different from the first orientation.

Figure 7:
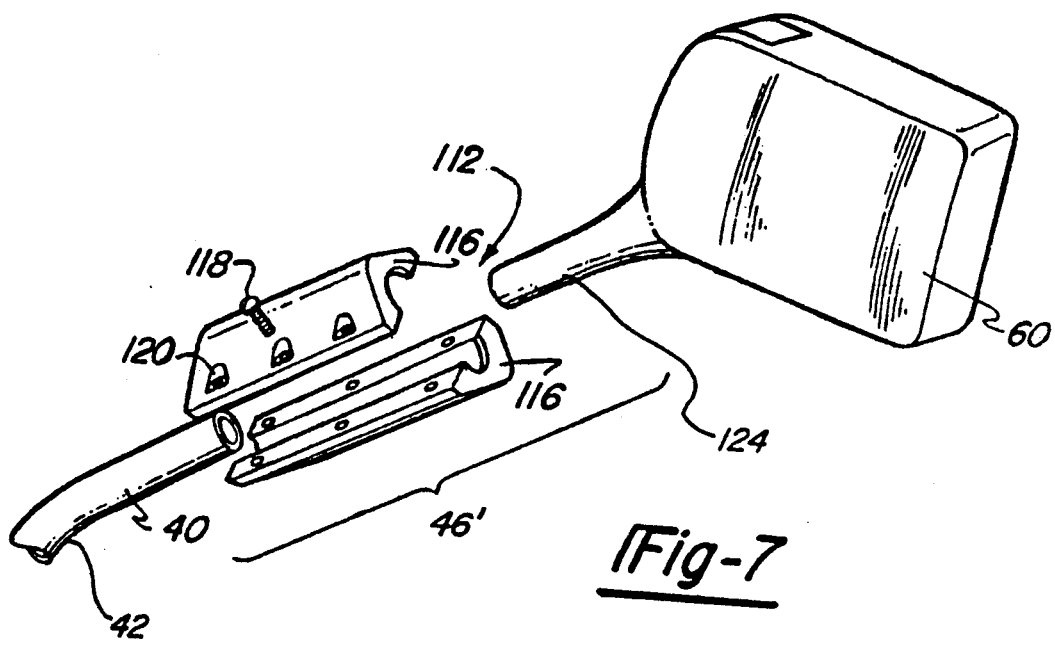
FIG. 7 is an exploded assembly view of the embodiment of present invention shown in FIG. 6.

FIGS. 6 and 7 depict another embodiment of mirror assembly 112 mounted on the truck door on the driver's side. Assembly 112 consists of bracket 20 (as shown in FIG. 1), cantilever 40, an arm 124, mirror housing 60 and two clamps 116 (similar to clamp 28 shown in FIG. 1) disposed between an unthreaded end of arm 124 and an unthreaded end of cantilever 40. Clamps 28 are secured together by a plurality of 20 fasteners 118 fitting through holes 120. Clamps 116 securely engage cantilever 40 in place relative to arm 64. Assembly 112 may also be similarly attached to a quarter panel.

While the invention has been described in conjunction with specific embodiments, it is evident that many alternatives, modifications, and variations will be apparent to those skilled in the art in light of the disclosure herein. It is intended that all such alternatives, modifications, and variations are included herein that fall within the spirit and scope of the appended claims.

We claim:

1. A mirror assembly for mounting onto a vehicle, the assembly enabling a driver of the vehicle to view around and about the vehicle, the assembly comprising:
   (a) a mounting bracket which is secureable to the vehicle;
   (b) a cantilever which is rotatable and slidable relative to the vehicle, the cantilever being engageable in multiple mounting positions relative to the vehicle, the cantilever being secured to the mounting bracket;
   (c) a linkage having a mating arm, the linkage being secureable to the cantilever; and
   (d) a detachable mirror housing, the housing being secured to the cantilever by the mating arm, the engagement between the mating arm and the detachable mirror housing having two alternative mounting orientations, the engagement between the mating arm and the mirror housing enabling the mirror housing to be disengaged from the first orientation and subsequently reengaged thereto in the second orientation, the second orientation being essentially opposite to the first orientation.

2. The mirror assembly of claim 1, wherein the housing has an elongated recessed portion, and the mating arm has a branch extending therefrom, the elongated recessed portion and the branch being cooperatively engaged in the first orientation and in the second orientation.

3. The mirror assembly of claim 1, wherein the cantilever is a hollow tubular member.

4. The mirror assembly of claim 1, wherein the first orientation provides the driver with an expanded field of view of objects disposed alongside the vehicle, and the second orientation provides the driver with an expanded field of view of objects disposed behind the vehicle.

5. The mirror assembly of claim 1, wherein the mating arm is rotatable relative to the cantilever.

6. The mirror assembly of claim 1, wherein the height of the mirror housing is adjustable by sliding the cantilever relative to the housing.

7. The mirror assembly of claim 1, wherein the height of the mirror housing is adjustable by sliding the linkage relative to the cantilever.

8. A mirror assembly for mounting onto a vehicle, the assembly enabling a driver of the vehicle to view around and about the vehicle, the assembly comprising:
   (a) a bracket which is mountable to the vehicle;
   (b) a hollow tubular member that is rotatable and slidable relative to the vehicle, the hollow tubular member being secureable to the mounting bracket, the hollow tubular member being engageable in multiple mounting positions relative to the vehicle;
   (c) a linkage having a mating arm, the linkage being securable to the hollow tubular member, the linkage being rotatable and slidable relative to the hollow tubular member; and (d) a detachable mirror housing, the housing being securable to the hollow tubular member by the mating arm, the engagement between the mating arm and the detachable mirror housing having two alternative mounting orientations, the engagement between the mating arm and the mirror housing enabling the mirror housing to be disengaged from the first orientation and subsequently reengaged thereto in the second orientation, the second orientation being essentially opposite to the first orientation.

9. The mirror assembly of claim 8, wherein the housing has an elongated recessed portion, and the mating arm has a branch extending therefrom, the elongated recessed portion and the branch being cooperatively engaged in the first orientation and in the second orientation.

10. The mirror assembly of claim 8, wherein the first orientation provides the driver with an expanded field of view of objects disposed alongside the vehicle, and the second orientation provides the driver with an expanded field of view of objects disposed behind the vehicle.

11. The mirror assembly of claim 8, wherein the mating arm is rotatable relative to the hollow tubular member.

12. The mirror assembly of claim 8, wherein the height of the mirror housing is adjustable by sliding the cantilever relative to the housing.

13. The mirror assembly of claim 8, wherein the height of the mirror housing is adjustable by sliding the linkage relative to the cantilever.

* * * * *